United States Patent
Davidson

(10) Patent No.: US 9,923,806 B2
(45) Date of Patent: Mar. 20, 2018

(54) NETWORK TRAFFIC ROUTING TOOL

(71) Applicant: Bank of America Corporation, Charlotte, NC (US)

(72) Inventor: John Daniel Davidson, Versailles, KY (US)

(73) Assignee: Bank of America Corporation, Charlotte, NC (US)

( * ) Notice: Subject to any disclaimer, the term of this patent is extended or adjusted under 35 U.S.C. 154(b) by 343 days.

(21) Appl. No.: 14/935,578

(22) Filed: Nov. 9, 2015

(65) Prior Publication Data

US 2017/0134260 A1    May 11, 2017

(51) Int. Cl.
*H04L 12/707* (2013.01)
*H04L 12/24* (2006.01)
*G06F 9/44* (2006.01)
*G06Q 10/06* (2012.01)

(52) U.S. Cl.
CPC .......... *H04L 45/22* (2013.01); *G06F 8/71* (2013.01); *H04L 41/5054* (2013.01); *G06Q 10/06* (2013.01)

(58) Field of Classification Search
CPC ... H04L 45/22; H04L 41/142; H04L 41/5054; H04L 41/0813; G06F 8/60; G06F 8/61; G06F 8/65; G06F 8/71; G06Q 10/06–10/06313
See application file for complete search history.

(56) References Cited

U.S. PATENT DOCUMENTS 8,644,146 B1    2/2014    Kurtz et al.
8,745,188 B2    6/2014    Westerfeld et al.
2013/0151421 A1*    6/2013    Van Der Ploeg ...... G06Q 10/06 705/301
2015/0067635 A1*    3/2015    Chen ...................... G06Q 10/06 717/102
2016/0373478 A1*    12/2016    Doubleday .......... H04L 63/1433

OTHER PUBLICATIONS

Online article, "BlueGreenDeployment" by Martin Fowler, published Mar. 1, 2010 at https://martinfowler.com/bliki/BlueGreenDeployment.html.*

* cited by examiner

*Primary Examiner* — Wing F Chan
*Assistant Examiner* — Raji Krishnan
(74) *Attorney, Agent, or Firm* — Michael A. Springs

(57) ABSTRACT

A network traffic routing apparatus includes a memory and a processor. The processor receives a change to the first production environment and determines a score for deploying the change. The score indicates a probability that the change, when deployed, will conflict with another change from a plurality of scheduled changes. The processor determines an aggregate score by summing the score and a plurality of scores for the plurality of scheduled changes. The processor also determines that the aggregate score is below a threshold and in response to that determination, schedules the deployment of the change. The processor further routes network traffic from the first production environment to the second production environment. The processor deploys the change to the first production environment after the network traffic has been routed to the second production environment, and after the change has been deployed, routes the network traffic back to the first production environment.

20 Claims, 3 Drawing Sheets ures, descriptions, and claims

NETWORK TRAFFIC ROUTING TOOL

TECHNICAL FIELD

This disclosure relates generally to a tool for routing network traffic, specifically routing network traffic when deploying changes to a production environment.

BACKGROUND

A network may route traffic to multiple nodes. When a change is being deployed to a certain node, traffic to that node may stall and/or be blocked. As a result, the network may operate slower.

SUMMARY OF THE DISCLOSURE

According to one embodiment, a network traffic routing apparatus includes a memory and a processor. The memory stores an address for a first production environment and an address for a second production environment. The processor receives a change to the first production environment and determines a score for deploying the change. The score indicates a probability that the change, when deployed, will conflict with another change from a plurality of scheduled changes. The processor determine an aggregate score by summing the score and a plurality of scores for the plurality of scheduled changes. The processor also determines that the aggregate score is below a threshold and in response to the determination that the aggregate score is below the threshold, schedules the deployment of the change. Before the deployment of the change, the processor further routes network traffic from the first production environment to the second production environment based on the address of the second production environment. The processor also deploys the change to the first production environment after the network traffic has been routed to the second production environment and after the change has been deployed, routes the network traffic back to the first production environment based on the address of the first production environment.

According to another embodiment, a method includes storing, by a network traffic routing apparatus, an address for a first production environment and an address for a second production environment and receiving a change to the first production environment. The method also includes determining a score for deploying the change. The score indicates a probability that the change, when deployed, will conflict with another change from a plurality of scheduled changes. The method also includes determining an aggregate score by summing the score and a plurality of scores for the plurality of scheduled changes. The method includes determining that the aggregate score is below a threshold. The method further includes in response to the determination that the aggregate score is below the threshold, scheduling the deployment of the change and before the deployment of the change, routing, by the network traffic routing apparatus, network traffic from the first production environment to the second production environment based on the address of the second production environment. The method also includes deploying the change to the first production environment after the network traffic has been routed to the second production environment and after the change has been deployed, routing, by the network traffic routing apparatus, the network traffic back to the first production environment based on the address of the first production environment.

According to another embodiment, a system includes a first production environment, a second production environment, and a network traffic routing apparatus. The network traffic routing apparatus stores an address for the first production environment and an address for the second production environment and receives a change to the first production environment. The network traffic routing apparatus also determines a score for deploying the change. The score indicates a probability that the change, when deployed, will conflict with another change from a plurality of scheduled changes. The network traffic routing apparatus determine an aggregate score by summing the score and a plurality of scores for the plurality of scheduled changes. The network traffic routing apparatus determines that the aggregate score is below a threshold. The network traffic routing apparatus further in response to the determination that the aggregate score is below the threshold, schedules the deployment of the change and before the deployment of the change, routes network traffic from the first production environment to the second production environment based on the address of the second production environment. The network traffic routing apparatus also deploys the change to the first production environment after the network traffic has been routed to the second production environment and after the change has been deployed, routes the network traffic back to the first production environment based on the address of the first production environment.

Certain embodiments may provide one or more technical advantages. For example, an embodiment improves network traffic by routing traffic away from production environments to which change are being deployed. As another example, an embodiment improves the functionality of a network when changes are being deployed over the network by routing traffic to production environments that are capable of servicing the traffic. As yet another example, an embodiment maintains the capabilities of a network and the functions of a production environment when changes are being deployed to the production environment by routing requests to other production environments that can provide services. As yet another example, an embodiment improves and/or maintain network communications when changes are being deployed by routing traffic away from nodes where the traffic might stall and/or be blocked. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
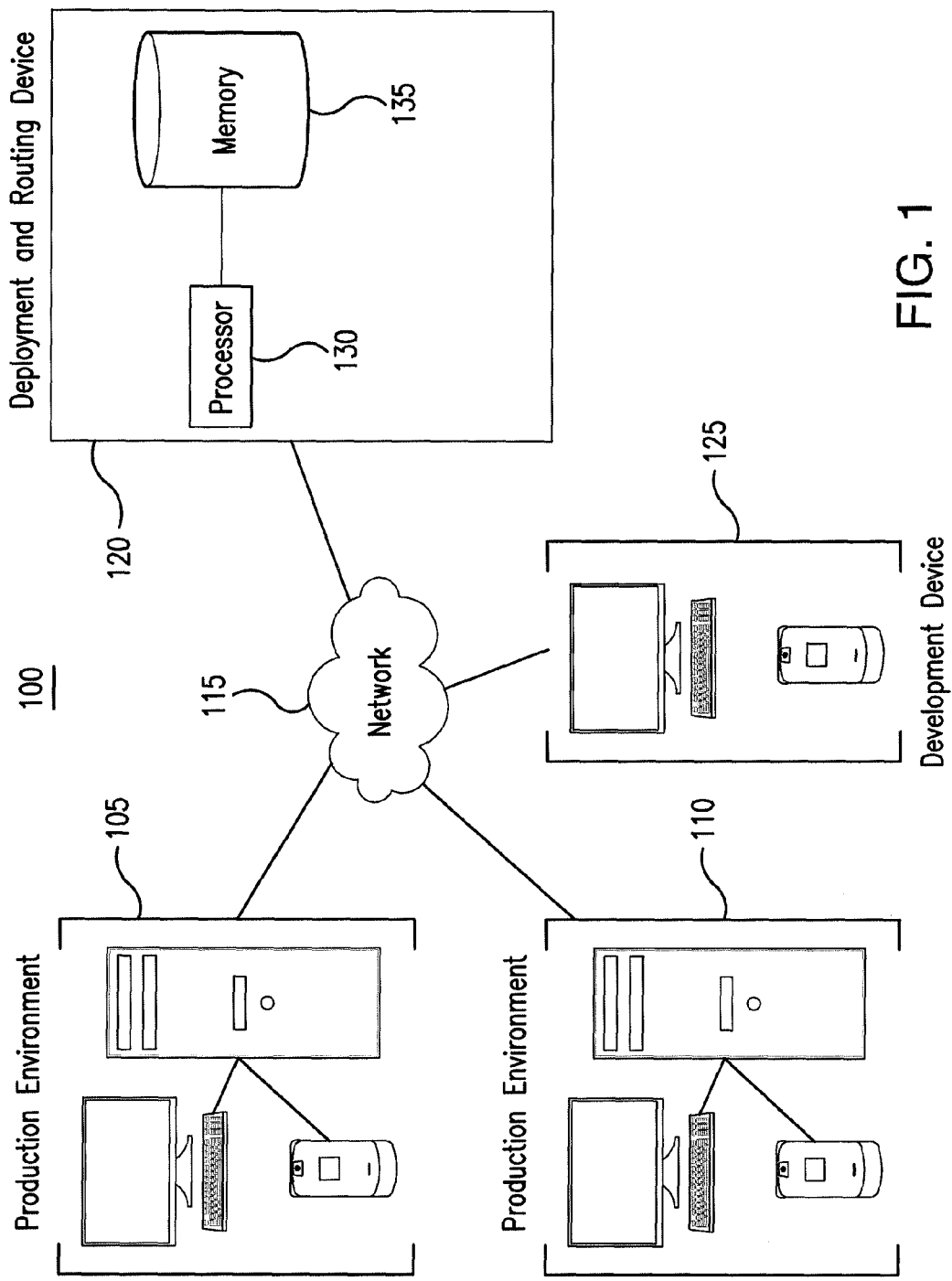
FIG. 1 illustrates a system for routing network traffic.
Figure 2:
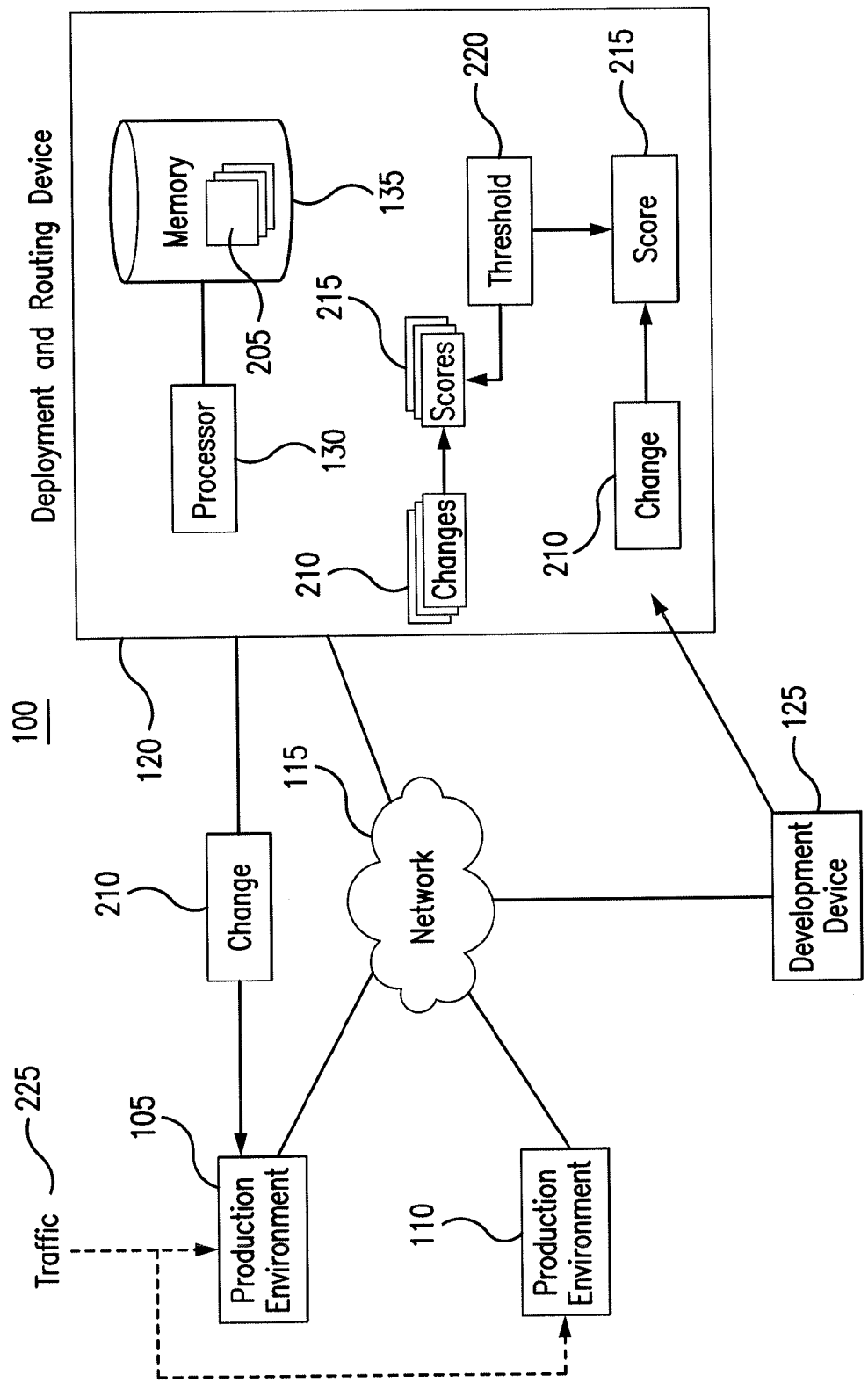
FIG. 2 illustrates the system of FIG. 1 deploying a change.
Figure 3:
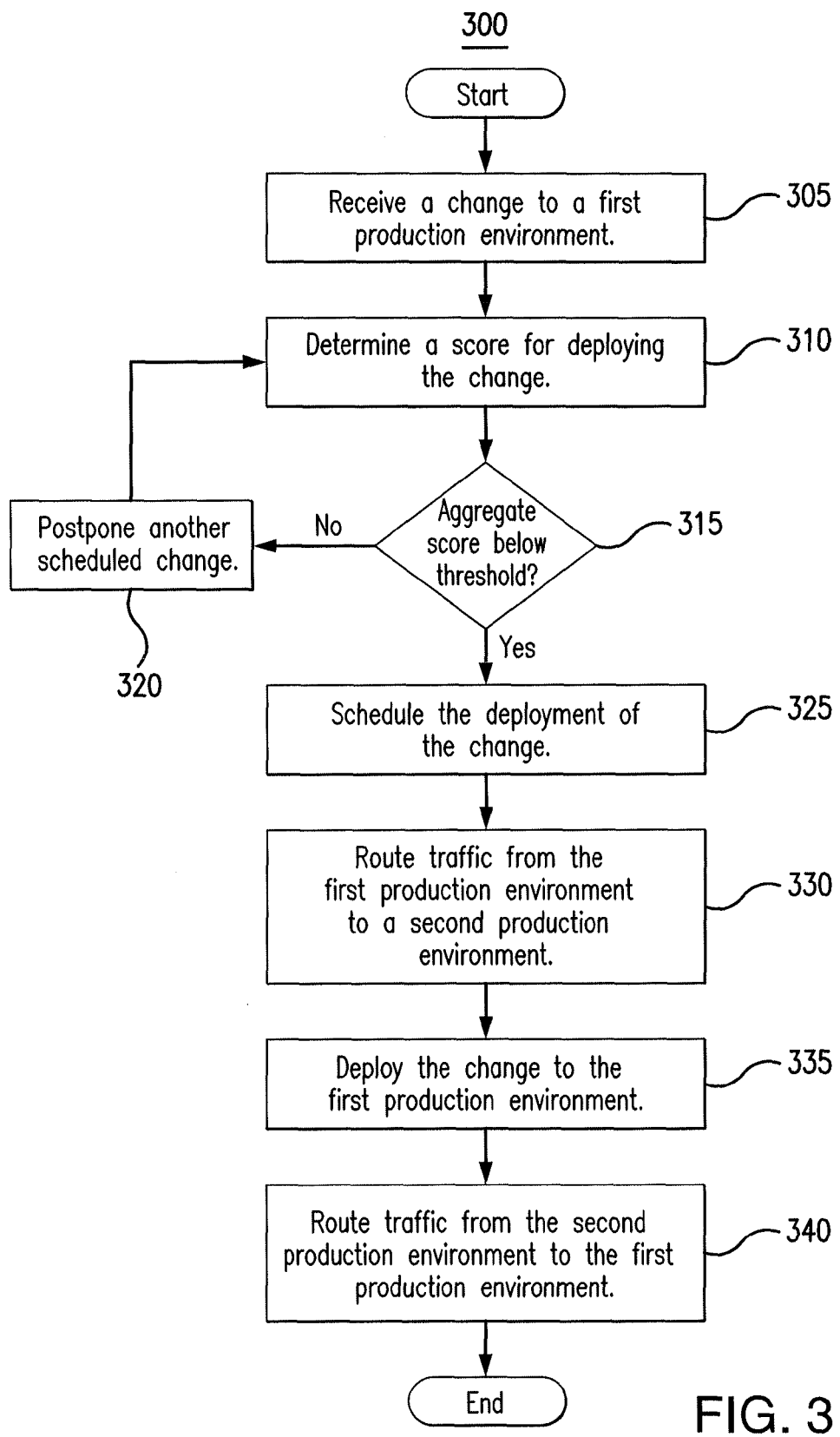
FIG. 3 is a flowchart illustrating a method for routing network traffic using the system of FIG. 1.

Embodiments of the present disclosure and its advantages are best understood by referring to FIGS. 1 through 3 of the drawings, like numerals being used for like and corresponding parts of the various drawings.

Various devices provide services to other devices over a network. For example, a device may authenticate other devices over the network. As another example, a device may encrypt messages traveling over the network. To provide these services, the network routes network traffic to and from these devices that provide the services. The traffic may include requests for service and/or responses to those requests. On occasion, the devices that provide services need to be updated and/or changed. For example, the devices may need their software updated and/or patched. As another example, the devices may need certain pieces of hardware to be replaced and/or reconfigured. When these changes are taking place, the devices may be unable to provide the services and/or may be unable to provide the services as efficiently. As a result, requests to these devices may stall and/or be blocked, which causes the network to operate slower. Furthermore, when multiple changes are being deployed at the same time, these changes may conflict and cause the devices to be unable to provide services after deployment.

For example, a device may be part of a production environment that provides a service to other devices and/or production environments of a network. To provide that service the production environment receives and/or sends traffic to other devices of the of the network. When a change, such as a code change for example, is being deployed to the production environment, the production environment may slow down and/or become unable to handle requests from other devices. As a result, the requests from the other devices may stall and/or be blocked by the production environment. Thus, deployment of the change causes the production environment to be unable to provide services to other network nodes. If this outcome can be predicted, than it may be possible to route the network traffic to an auxiliary or back-up service provider when the change is being deployed. However, when multiple changes are being deployed to the production environment, it becomes more difficult to determine beforehand whether the deployment of these changes will cause the production environment to be unable to provide services to other devices of the network.

This disclosure contemplates a system that continues to provide services to devices of the network even when changes are being deployed to a production environment. The system tracks a series of changes that are scheduled to be deployed to a production environment. The system determines whether one or more of the scheduled changes will likely cause the production environment to be unable to provide services to other nodes of the network. The system reschedules changes as necessary. Furthermore, the system routes network traffic to another production environment when the scheduled changes are being deployed to the production environment. In this manner, the system may improve network traffic and/or the functionality of the network when changes are being deployed in certain embodiments. Moreover, the system may maintain the capabilities of the network and the functions of the production environment when changes are being deployed in some embodiments. Furthermore, the system may improve and/or maintain network communications when changes are being deployed in some embodiments.

The system will be described in more detail using FIGS. 1 through 3. FIG. 1 will describe the system generally. FIG. 2 will describe the system in more detail. FIG. 3 will describe an operation of the system.

FIG. 1 illustrates a system 100 for routing network traffic. As illustrated in FIG. 1, system 100 includes production environments 105 and 110, network 115, deployment and routing device 120, and development device 125. System 100 may be used to improve network traffic when changes are being deployed to production environments 105 and 110.

Production environments 105 and 110 include any number of devices such as computers, mobile devices and/or servers to provide any suitable service to other nodes and/or devices of system 100. For example, production environment 105 may authenticate users in system 100. Production environment 105 may receive authentication requests from users and may determine whether a user has provided sufficient credentials to be considered authenticated. As another example, production environment 105 may receive and process transactions from other devices of system 100. This disclosure contemplates production environment 105 providing any suitable services to another node of system 100. In certain embodiments, production environment 110 provides the same service as production environment 105.

This disclosure contemplates production environments 105 and 110 including any appropriate device(s) that can communicate over network 115. For example, these devices may be a computer, a laptop, a wireless or cellular telephone, an electronic notebook, a personal digital assistant, a tablet, a server, a mainframe, or any other device capable of receiving, processing, storing, and/or communicating information with other components of system 100. These devices may also include a user interface, such as a display, a microphone, keypad, or other appropriate terminal equipment usable by a user. In some embodiments, an application executed by these devices may perform the functions described herein.

When changes are being deployed to production environment 105, network traffic to production environment 105 may be routed to production environment 110. In this manner, production environment 110 continues to provide the requested service when production environment 105 is unable to provide the requested service. After the change has been deployed successfully to production environment 105, network traffic may be routed back to production environment 105. The changes may then be deployed to production environment 110. In this manner, network traffic may be improved when changes are being deployed. Furthermore, the functionality of production environment 105 may be maintained while changes are being deployed.

Network 115 may facilitate communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Deployment and routing device 120 schedules the deployment of changes and directs the routing of network traffic in system 100. As illustrated in FIG. 1, deployment and routing device 120 includes a processor 130 communicatively coupled to a memory 135. This disclosure contemplates processor 130 and memory 135 being configure to perform any of the functions of deployment and routing device 120 described herein.

Processor 130 executes software stored on memory 135 to perform any of the functions described herein. Processor 130 controls the operation and administration of deployment and routing device 120 by processing information received from network 115, production environments 105 and 110, and memory 135. Processor 130 includes any hardware and/or software that operates to control and process information. Processor 125 may be a programmable logic device, a microcontroller, a microprocessor, any suitable processing device, or any suitable combination of the preceding.

Memory 135 stores, either permanently or temporarily, data, operational software, or other information for processor 130. Memory 135 includes any one or a combination of volatile or non-volatile local or remote devices suitable for storing information. For example, memory 135 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 135, a disk, a CD, or a flash drive. In particular embodiments, the software includes an application executable by processor 130 to perform one or more of the functions described herein.

Deployment and routing device 120 schedules the deployment of requested changes. In certain embodiments, deployment and routing device 120 receives a requested change such as, for example, a code change to production environment 105. Deployment and routing device 120 examines the request and determine whether the change should be deployed to production environment 105. For example, if the change was requested in error or if the change is invalid or improper, deployment and routing device 120 may determine that the change should not be deployed to production environment 105. If the change should be deployed to production environment 105, deployment and routing device 120 schedules the deployment of the change.

In scheduling the deployment of the change, deployment and routing device 120 determines and/or use a score associated with deploying the change. For example, the score may indicate a likelihood that the deployment of the change will cause production environment 105 to be unable to provide services to other nodes of system 100. As an example, if the change involves modifications to a core server of production environment 105, then the likelihood that the change may prevent production environment 105 from providing services is high. Thus, the resulting score is high. However, if the change involves a modification to a peripheral device and/or feature of production environment 105, then the likelihood that the change may prevent production environment 105 from providing services is low. Thus, the resulting score is low.

Deployment and routing device 120 then determines an aggregate score using the score and other scores for other scheduled changes. Deployment and routing device 120 compares the aggregate score to a threshold to determine whether the scheduled changes should be deployed. If the aggregate score is above the threshold, then deployment and routing device 120 may reschedule the change and/or reschedule other changes so that the change may be scheduled. For example, if a score for a change makes the aggregate score exceed the threshold, deployment and routing device 120 may schedule that change to be deployed at another time. If that change must be deployed at that time, then deployment and routing device 120 may reschedule other changes that were also scheduled to be deployed at that time. In this manner, deployment and routing device 120 man minimize the likelihood that deployment of a change results in production environment 105 being unable to provide services. Furthermore, if the change does cause production environment 105 to be unable to provide services, deployment and routing device 120 may minimize the number of changes being deployed at the same time so that any errors or mistakes can be easily traced and remedied.

When changes are being deployed to production environment 105, network traffic to production environment 105 may stall and/or be blocked because production environment 105 cannot respond to that network traffic. Deployment and routing device 120 may route that network traffic to production environment 110 so that production environment 110 can respond to that network traffic and/or provide the services that production environment 105 cannot provide. After the change has been deployed to production environment 105, deployment and routing device 120 may route the network traffic back to production environment 105. The change may then be deployed to production environment 110. In this manner, the functionality of production environment 105 may be maintained even when a change is being deployed to production environment 105. Moreover, network traffic across network 115 may not be stalled and/or blocked when the change is being deployed to production environment 105.

Development device 125 may include any suitable device such as a computer and/or a mobile device used to develop and/or code changes. Development device 125 may be used to develop the change and to request the change. When development device 125 requests that a change be deployed, development device 125 may communicate a request to deployment in routing device 120 to deploy the change. Development device 125 may be a computer, a laptop, a wireless or cellular telephone, an electronic notebook, a personal digital assistant, a tablet, a server, a mainframe, or any other device capable of receiving, processing, storing, and/or communicating information with other components of system 100. Development device 125 may also include a user interface, such as a display, a microphone, keypad, or other appropriate terminal equipment usable by a user. In some embodiments, an application executed by development device 125 performs the functions described herein.

In certain embodiments, by using system 100 network traffic across network 115 is improved. In some embodiments, by using system 100 the functionality of production environments 105 and 110 is maintained even when changes are being deployed to production environments 105 and 110.

Modifications, additions, or omissions may be made to system 100 without departing from the scope of the invention. For example, deployment and routing device 120 may be a distributed server and/or distributed across multiple devices. As another example, the components of system 100 may be integrated or separated. For example, development device 125 may be incorporated into deployment and routing device 120. Furthermore, system 100 may include any number of production environments and/or development devices.

FIG. 2 illustrates the system 100 of FIG. 1 deploying a change. Although FIG. 2 does not illustrate each element of system 100 in full detail, that is not to be construed as an omission or alteration of those elements of system 100.

Development device 125 may communicate a change 210 to deployment and routing device 120. Change 210 may be any appropriate change to be deployed to production environment 105. For example, change 210 may be a code change or a deployment change. If change 210 is a code change, then deployment of change 210 involves writing the code into a device of production environment 105 that executed the code. If change 210 is a deployment change, then deployment of change 210 involves replacing and/or reconfiguring a hardware component of production environment 105. In particular embodiments, development device 125 may be used to develop and communicate change 210. For example, development device 125 may be used to write the code change if change 210. As another example, development device 125 may be used to describe the deployment change.

Deployment and routing device 120 may receive change 210 and determine a score 215 for change 210. Score 215 may indicate a likelihood that change 210, when deployed, will prevent production environment 105 from providing services to other nodes of system 100. For example, if change 210 is a code change to a core device or core server of production environment 105, then score 215 may be high. As another example, if change 210 is a change to a minor function or minor feature of production environment 105, then score 215 may be low. As yet another example, if change 210 requires a server of production environment 105 to be replaced and/or reconfigured, then score 215 may be high. Deployment and routing device 120 may store and/or track a score 215 for every requested change 210. Deployment and routing device 120 may sum the scores 215 of every change 210 that is scheduled to be deployed at a certain time.

In certain embodiments, score 215 indicates a probability that a change 210 when deployed will conflict with another scheduled change. For example, the conflict may arise because both changes 210 are changing the same code in production environment 105. As another example, the conflict may arise because change 210 is changing code in a component of production environment 105 that is also scheduled to be reconfigured and/or replaced. As yet another example, the conflict may arise because both changes are changes to core functionality or core components of production environment 105 which presents a high likelihood that production environment 105 will be unable to provide services if both changes 210 are deployed at the same time.

In particular embodiments, deployment and routing device 120 may update score 215 (and sum of scores 215) and/or threshold 220 daily. For example, deployment and routing device 120 may determine all the changes 210 that are scheduled to be deployed on a particular day. Deployment and routing device 120 may then aggregate these scores 215 for those changes and compare the aggregate score to threshold 220. Each day deployment and routing device 120 may re-determine the scores 215 for the changes 210 and re-aggregate the scores 215.

In certain embodiments, deployment and routing device 120 may generate a report that includes all the changes 210 scheduled to be deployed on a particular day and a score 215 (or sum of scores 215) for the particular day. The score 215 may be an aggregate score 215 for all the changes 210 that are scheduled to be deployed that particular day. The report may be presented to an administrator, such as for example on development device 125. By reviewing the report the administrator may come to understand which changes should be scheduled on a particular day and which changes should not be scheduled.

Deployment and routing device 120 may compare score 215 and/or a sum of scores 215 against a threshold 220 to determine whether a scheduled change 210 or multiple schedule changes 210 should be deployed at a certain time. If score 215 is below threshold 220, then the scheduled change 210 may be deployed. Otherwise, deployment and routing device 120 may perform remedial measures such as rescheduling certain changes 210. For example, if threshold 220 is a value of 100 and a requested change 210 has a score of ten, then deployment and routing device 120 may schedule change 210 to be deployed at a certain time when the sum of scores 215 for the already scheduled changes is below ninety. If deployment and routing device 120 schedules change 210 to be deployed at a time when the sum of scores 215 is above ninety, then deployment and routing device 120 may reschedule the requested change 210 and/or another scheduled change 210. By rescheduling a change 210, deployment and routing device 120 may lower the sum of scores 215 so that another change 210 may be scheduled. By scheduling changes 210 based on threshold 220 and scores 215, deployment and routing device 120 may reduce the likelihood that production environment 105 will be prevented from providing services after changes 210 have been deployed. As a result, the functionality of production environment 105 may be maintained and/or improved.

In particular embodiments, deployment and routing device 120 may determine a plurality of changes 210 that should not be deployed in response to a determination that the sum of scores 215 has exceeded threshold 220. For example, if three changes are scheduled to be deployed at a particular time but the sum of scores 215 for these three changes exceeds threshold 220, deployment and routing device 120 may reschedule two of the changes to be deployed at a separate time in order to lower the sum of scores 215.

Deployment and routing device 120 may store addresses 205. Each address 205 may be an address, such as an Internet Protocol address or a media access control address, of a component of system 100. For example, one address 205 may be the address for production environment 105. As another example, one address 205 may be the address for production environment 110. A component of system 100 may communicate messages to another component of system 100 using the address 205 of the receiving component. For example, development device 125 may communicate change 210 to deployment and routing device 120 using the address 205 of deployment and routing device 120. As another example, deployment and routing device 120 may communicate change 210 to production environment 105 using address 205 of production environment 105. This disclosure contemplates addresses 205 being any appropriate items that identify a component of system 100.

Deployment and routing device 120 may direct the routing of network traffic 225 before deploying change 210 to production environment 105. For example, deployment and routing device 120 may route network traffic 225 away from production environment 105 to production environment 110 while change 210 is being deployed to production environment 105. After change 210 has been deployed to production environment 105, deployment and routing device 120 may direct traffic 225 to be routed back to production environment 105. In this manner, production environment 110 may provide services requested by traffic 225 while change 210 is being deployed to production environment 105. As a result, the functionality of production environment 105 may be maintained while change 210 is being deployed to production environment 105. Moreover, network traffic 225 may not become stalled and/or blocked while change 210 is being deployed to production environment 105. In certain embodiments, deployment and routing device 120 may execute a script, such as a routing script, to direct the routing of network traffic 225.

In certain embodiments, operation of system 100 proceeds as follows. A user requests change 210 to be deployed into production environment 105. Deployment and routing device 120 records change 210. Deployment and routing device 120 then analyzes a plurality of changes 210 that have also been requested to be deployed. Based on this analysis, deployment and routing device 120 determines which changes 210 should be deployed at particular times. Deployment and routing device 120 may make this determination automatically using scores 210 and threshold 220 as discussed before. Deployment and routing device 120 may also present scores 210 and threshold 220 to an administrator who manually determines which changes 210 should be deployed at a particular time. Once changes 210 have been scheduled, deployment and routing device 120 prepares system 100 for the deployment of changes 210. Deployment and routing device 120 directs the routing of network traffic 225 during deployment of changes 210. Deployment and routing device 120 also generates one or reports that allow for the tracking of changes 210, scores 215, and deployments. Deployment and routing device 120 is implemented using PHP: Hypertext Preprocessor and/or MySQL. Deployment and routing device 120 is administered via web browser over a secure private network 115.

FIG. 3 is a flowchart illustrating a method 300 for routing network traffic using the system 100 of FIG. 1. In particular embodiments, deployment and routing device 120 performs method 300. By performing method 300, deployment and routing device 120 may maintain the functionality of production environments while changes are being deployed to those production environments. Furthermore, by performing method 300 deployment and routing device 120 may improve network traffic in system 100.

Deployment and routing device 120 begins by receiving a change to a first production environment in step 305. The change may be any appropriate change. For example, the change may be a code change to the production environment. As another example, the change may be a change to the deployment of the production environment. In step 310, deployment and routing device 120 determines a score for deploying the change. The score may indicate a likelihood that the change will prevent the production environment from performing services during or after the change is deployed.

In step 315, deployment and routing device 120 determines if the aggregate score is below a threshold. If the aggregate score is not below the threshold, deployment and routing device 120 continues to step 320 to postpone another scheduled change. In certain embodiments, by postponing another scheduled change the aggregate score for the scheduled changes may be lowered below the threshold.

If the aggregate score is below the threshold, deployment and routing device 120 schedules the deployment of the change in step 325. Before the deployment of the change, deployment and routing device 120 routes traffic from the first production environment to a second production environment in step 330. In this manner, the functionality of the first production environment may be maintained while changes are being deployed to the first production environment. In step 335, deployment and routing device 120 deploys the change in the first production environment. Then in step 340, deployment and routing device 120 routes traffic from the second production environment back to the first production environment production environment.

Modifications, additions, or omissions may be made to methods 300 and 400 depicted in FIGS. 3 and 4. Methods 300 and 400 may include more, fewer, or other steps. For example, steps may be performed in parallel or in any suitable order. While discussed as key manager 120 and node 105 performing the steps, any suitable component of system 100, such as node 110 or ledger 135 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A network traffic routing apparatus comprising:
a memory configured to store an address for a first production environment, an address for a second production environment and an application software; and
a processor communicatively coupled to the memory, the processor, by executing the application software stored in the memory, configured to:
receive a change to the first production environment;
determine a score for deploying the change, the score indicates a probability that the change, when deployed, will conflict with another change from a plurality of scheduled changes;
determine an aggregate score by summing the score and a plurality of scores for the plurality of scheduled changes;
determine that the aggregate score is below a threshold;
in response to the determination that the aggregate score is below the threshold, schedule the deployment of the change;
before the deployment of the change, route network traffic from the first production environment to the second production environment based on the address of the second production environment;
deploy the change to the first production environment after the network traffic has been routed to the second production environment; and
after the change has been deployed, route the network traffic back to the first production environment based on the address of the first production environment.

2. The network traffic routing apparatus of claim 1, wherein the processor is further configured to execute a routing script to route the network traffic.

3. The network traffic routing apparatus of claim 1, wherein the processor is further configured to determine a change from the plurality of scheduled changes that should not be deployed in response to a determination that the aggregate score is above the threshold.

4. The network traffic routing apparatus of claim 1, wherein the second production environments provides a service that is also provided by the first production environment.

5. The network traffic routing apparatus of claim 1, wherein the processor is configured to update the aggregate score daily based on the changes scheduled to be deployed on a particular day.

6. The network traffic routing apparatus of claim 1, wherein the processor is further configured to generate a report comprising all the changes scheduled to be deployed on a particular day and an aggregate score for the particular day.

7. The network traffic routing apparatus of claim 1, wherein the change is one or more of a change to code deployed in the first production environment and a change to the deployment of the first production environment.

8. A method comprising:
    storing, by a network traffic routing apparatus, an address for a first production environment and an address for a second production environment;
    receiving a change to the first production environment;
    determining a score for deploying the change, the score indicates a probability that the change, when deployed, will conflict with another change from a plurality of scheduled changes;
    determining an aggregate score by summing the score and a plurality of scores for the plurality of scheduled changes;
    determining that the aggregate score is below a threshold;
    in response to the determination that the aggregate score is below the threshold, scheduling the deployment of the change;
    before the deployment of the change, routing, by the network traffic routing apparatus, network traffic from the first production environment to the second production environment based on the address of the second production environment;
    deploying the change to the first production environment after the network traffic has been routed to the second production environment; and
    after the change has been deployed, routing, by the network traffic routing apparatus, the network traffic back to the first production environment based on the address of the first production environment.

9. The method of claim 8, further comprising executing, by the network traffic routing apparatus, a routing script to route the network traffic.

10. The method of claim 8, further comprising determining a change from the plurality of changes that should not be deployed in response to a determination that the aggregate score is above the threshold.

11. The method of claim 8, wherein the second production environments provides a service that is also provided by the first production environment.

12. The method of claim 8, further comprising updating the aggregate score daily based on the changes scheduled to be deployed on a particular day.

13. The method of claim 8, further comprising generating a report comprising all the changes scheduled to be deployed on a particular day and an aggregate score for the particular day.

14. The method of claim 8, wherein the change is one or more of a change to code deployed in the first production environment and a change to the deployment of the first production environment.

15. A system comprising:
    a first production environment;
    a second production environment; and
    a network traffic routing apparatus communicatively coupled to the first production environment and to the second production environment, the network traffic routing apparatus configured to:
    store an address for the first production environment and an address for the second production environment;
    receive a change to the first production environment;
    determine a score for deploying the change, the score indicates a probability that the change, when deployed, will conflict with another change from a plurality of scheduled changes;
    determine an aggregate score by summing the score and a plurality of scores for the plurality of scheduled changes;
    determine that the aggregate score is below a threshold;
    in response to the determination that the aggregate score is below the threshold, schedule the deployment of the change;
    before the deployment of the change, route network traffic from the first production environment to the second production environment based on the address of the second production environment;
    deploy the change to the first production environment after the network traffic has been routed to the second production environment; and
    after the change has been deployed, route the network traffic back to the first production environment based on the address of the first production environment.

16. The system of claim 15, wherein the network traffic routing apparatus is further configured to execute a routing script to route the network traffic.

17. The system of claim 15, wherein the network traffic routing apparatus is further configured to determine a change of the plurality of changes that should not be deployed in response to a determination that the aggregate score is above the threshold.

18. The system of claim 15, wherein the second production environments provides a service that is also provided by the first production environment.

19. The system of claim 15, wherein the network traffic routing apparatus is further configured to generate a report comprising all the changes scheduled to be deployed on a particular day and an aggregate score for the particular day.

20. The system of claim 15, wherein the change is one or more of a change to code deployed in the first production environment and a change to the deployment of the first production environment.

* * * * *